(12) United States Patent
Covey

(10) Patent No.: US 9,962,992 B1
(45) Date of Patent: May 8, 2018

(54) WHEEL FOR CENTER PIVOT IRRIGATION SYSTEM

(71) Applicant: Dustin Covey, Ulysses, KS (US)

(72) Inventor: Dustin Covey, Ulysses, KS (US)

( * ) Notice: Subject to any disclaimer, the term of this patent is extended or adjusted under 35 U.S.C. 154(b) by 46 days.

(21) Appl. No.: 15/078,878

(22) Filed: Mar. 23, 2016

Related U.S. Application Data

(60) Provisional application No. 62/139,396, filed on Mar. 27, 2015.

(51) Int. Cl.
   *B60B 1/06* (2006.01)
   *A01G 25/09* (2006.01)
   *B60B 15/00* (2006.01)

(52) U.S. Cl.
   CPC .............. *B60B 1/06* (2013.01); *A01G 25/092* (2013.01); *B60B 15/00* (2013.01)

(58) Field of Classification Search
   CPC .......... A01G 25/092; B60B 1/06; B60B 15/00
   USPC ..... 301/57, 73, 79, 65, 104, 64.704, 64.101, 301/64.102
   See application file for complete search history.

(56) References Cited

U.S. PATENT DOCUMENTS

| | | | | |
|---|---|---|---|---|
| 1,331,935 A | * | 2/1920 | Shelley | E02B 8/026 210/156 |
| 2,439,926 A | * | 4/1948 | Frederick | B60B 1/12 301/73 |
| 2,525,219 A | * | 10/1950 | Green | B60B 1/00 29/894.331 |
| 3,729,140 A | * | 4/1973 | Wagner | A01G 25/09 239/726 |
| 5,226,690 A | * | 7/1993 | Clark | B60B 15/02 301/43 |
| 5,451,001 A | * | 9/1995 | Kumm | A01G 25/09 239/726 |
| 6,428,114 B1 | * | 8/2002 | Sebode | B60B 1/06 301/64.102 |
| 8,657,215 B1 | * | 2/2014 | Blum | B60B 1/10 239/726 |
| 9,481,204 B1 | * | 11/2016 | Wiebe | A01G 25/09 |
| 2008/0283637 A1 | * | 11/2008 | Gillespie | A01G 25/09 239/726 |
| 2014/0361602 A1 | * | 12/2014 | Hiramaru | B62M 6/65 301/64.102 |

\* cited by examiner

*Primary Examiner* — S. Joseph Morano
*Assistant Examiner* — Jean Charleston
(74) *Attorney, Agent, or Firm* — Kenneth H. Jack; Davis & Jack, L.L.C.

(57) ABSTRACT

A center pivot irrigation system wheel including a hub having an axis of rotation and having lateral and oppositely lateral sides; a plurality of spoke pairs having distal ends and having proximal ends, each proximal end being attached to the hub, each spoke pair having lateral and oppositely lateral spokes, each lateral spoke being intersected by an axially extending plane of orientation, and said each oppositely lateral spoke being intersected by the same plane of orientation; a first plurality of axially extending through spaces, each through space being bounded by an adjacent pair of the spoke pairs; an annular rim having an outer surface, the distal end of each spoke being fixedly attached to the rim; and a plurality of treads, each tread being fixedly attached to the annular rim's outer surface.

7 Claims, 4 Drawing Sheets

WHEEL FOR CENTER PIVOT IRRIGATION SYSTEM

CLAIM OF PRIORITY FROM PREVIOUSLY FILED PROVISIONAL PATENT APPLICATION

This non-provisional patent application claims the benefit of and priority from U.S. provisional patent application No. 62/139,396 filed Mar. 27, 2015. The inventor disclosed in and applicant of said provisional application are the same. The Specification and Drawings which follow are substantially identical to those presented upon the filing of said provisional application.

FIELD OF THE INVENTION

This invention relates to center pivot overhead sprinkler irrigation systems and assemblies of the type incorporating a series of radially extending pipe segments supported by overhead trusses, and further supported by a series of wheeled "A" frame towers. This invention more particularly pertains to the wheels incorporated within such irrigation systems.

BACKGROUND OF THE INVENTION

Rubber tires or wheels which are commonly mounted at the bases of the "A" frame towers of common center pivot agricultural irrigation systems often undesirably slip and incur traction failures within muddy ground surfaces. Such rubber wheels often further undesirably accumulate compacted mud and debris at and about the tire's peripheral edge and tread, and within the wheel's central hub spaces.

The instant inventive center pivot irrigation wheel solves or ameliorates the drawbacks and deficiencies described above by providing a steel rimmed wheel having specially configured tread and spoke designs and patterns which maximizes traction while minimizing mud build up, and which facilitates easy and convenient mud and debris cleaning and removal.

BRIEF SUMMARY OF THE INVENTION

A first structural component of the instant inventive center pivot irrigation wheel comprises a wheel hub mounting disc. Where the wheel hub mounting disc is intended for mounting upon an irrigation center pivot wheel hub having eight (8) helically threaded lugs (as is common), such disc preferably has an octagonal and radial array of lug receiving apertures, such apertures being evenly circumferentially spaced about a circular center point or rotational axis of the disc. In a preferred embodiment, the wheel hub mounting disc has a central and axially positioned hub access aperture. The wheel hub mounting disc may suitably include a fewer or greater number of lug receiving apertures.

A further structural component of the instant inventive wheel comprises an annular or cylindrical spoke support flange, a lateral end of the spoke support flange being fixedly attached to or formed wholly with the circular peripheral edge of the wheel hub mounting disc. In the preferred embodiment, the spoke support flange forms a concavity which opens oppositely laterally for receipt of an irrigation center pivot wheel hub.

Further structural components of the instant inventive wheel comprise an array of circumferentially spaced and radially extending wheel spokes. In the preferred embodiment, such spokes are arranged in spoke pairs, each spoke among the spoke pairs having a proximal end which is fixedly attached to or formed wholly with the spoke support flange. In the preferred embodiment, each pair of spokes lies within or is intersected by a plane which intersects the wheel's axis of rotation. By arranging the spoke pairs to lie within such axis intersecting planes, the spoke pairs advantageously form a radially arrayed series of "V" shaped mud clearance passages or first through passages, each such passage extending axially with respect to the wheel's axis of rotation. Each such through space is circumferentially bounded by a circumferentially adjacent pair of the spoke pairs.

A further structural component of the instant inventive wheel comprises a cylindrical steel rim having radially inner and radially outer surfaces. The distal or radially outer ends of the spokes among the spoke pairs are preferably fixedly attached by welds to the steel rim's radial inward surface, and in the preferred embodiment, the spokes among each pair of spokes are axially splayed so that each spoke pair forms and defines an axially aligned "V" pattern.

Further structural components of the instant inventive wheel comprise a multiplicity of substantially rectangular and laterally oblongated treads, each tread preferably having a lateral length substantially equal to the lateral dimension of the steel rim. Similarly with the axial plane alignments of the spoke pairs, each tread preferably lies within a plane which intersects the wheel's axis of rotation. By arranging the wheel's treads to lie within such axial planes, a second series of lateral extending mud clearance through passages is advantageously formed, each second through space being bounded by a circumferentially adjacent pair of the treads.

The cylindrical configuration of the preferred steel rim component of the instant inventive wheel advantageously provides a high level of wheel floatation contact surface according to the formula: $a = \pi\, d\, l$, where "a" equals the ground contact area, "d" equals the wheel's diameter, and "l" equals the axial dimension of the rim. Such ground contact surface area is markedly greater than that provided by conventional rubber center pivot irrigation wheels and tires. The preferred axially extending and oriented treads of the inventive wheel advantageously maximize wheel traction in the direction of center pivot travel to compliment such maximized ground contact. Accordingly, the instant inventive wheel provides enhanced levels of ground contact and floatation for traversing soggy and muddy ground surfaces, and maximizes tower driving traction for moving center pivot rigs across such surfaces.

In the event of accumulations of mud about the wheel's annular outer surface and within and about the wheel's spokes, the first and second pluralities of axially extending mud clearance through channels or passages facilitate easy and quick cleaning of such wheels.

Accordingly, objects of the instant invention include the provision of a center pivot irrigation system wheel which incorporates structures, as described above, and which arranges those structures in relation to each other in manners described above, for the achievement of the functions and benefits described above.

Other and further objects, benefits, and advantages of the present invention will become known to those skilled in the art upon review of the Detailed Description which follows, and upon review of the appended drawings.

BRIEF DESCRIPTION OF THE DRAWINGS (Drawings submitted herewith are photographic in character. The Applicant asserts that such drawings offer sufficient detail and explanation of the invention to allow examination of the application. The Applicant requests that any requirement for substitution of line drawings be held in abeyance until examination is complete.)

Figure 1:
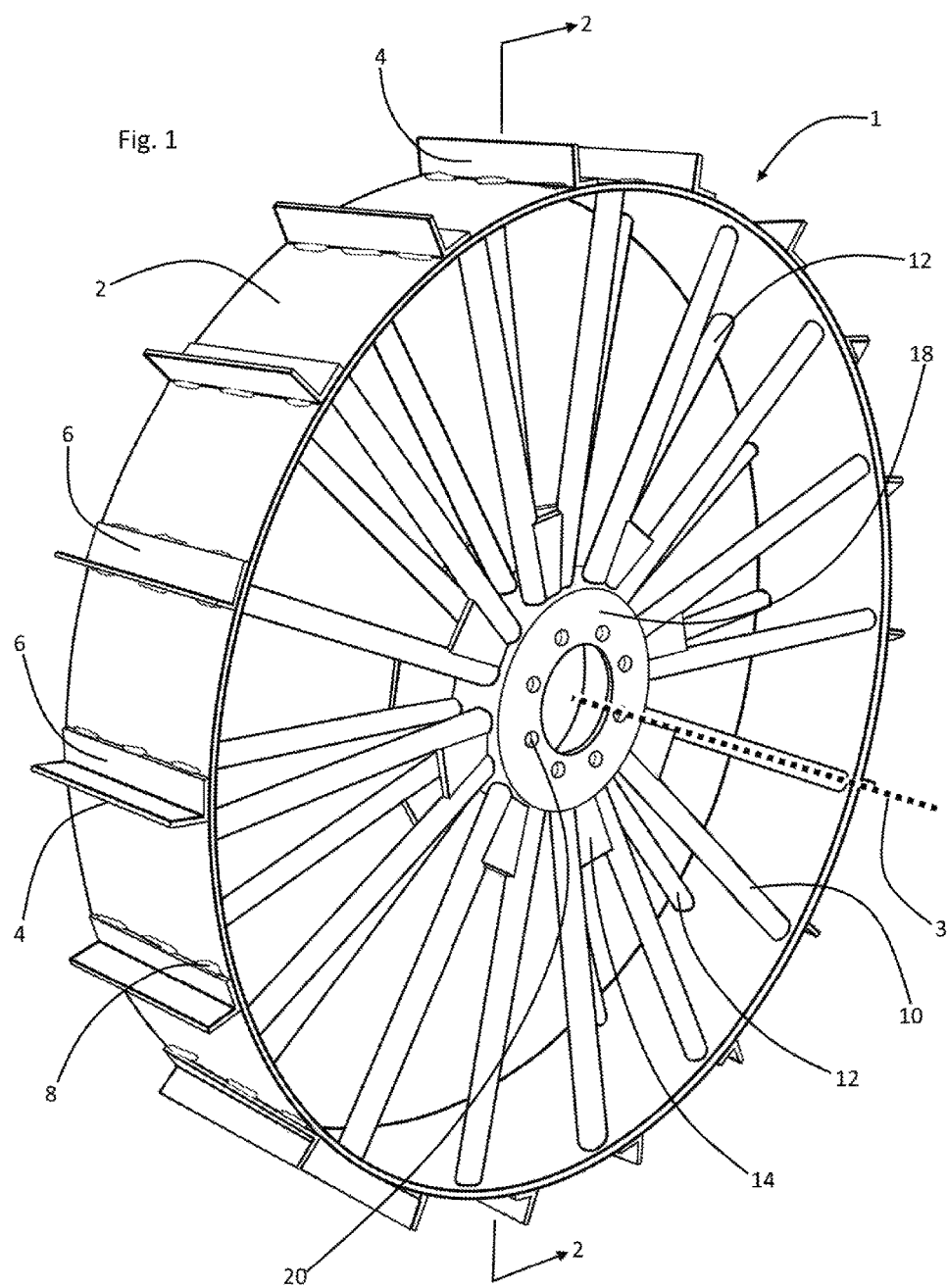
FIG. 1 is a perspective view of the instant inventive center pivot irrigation system wheel.
Figure 4:
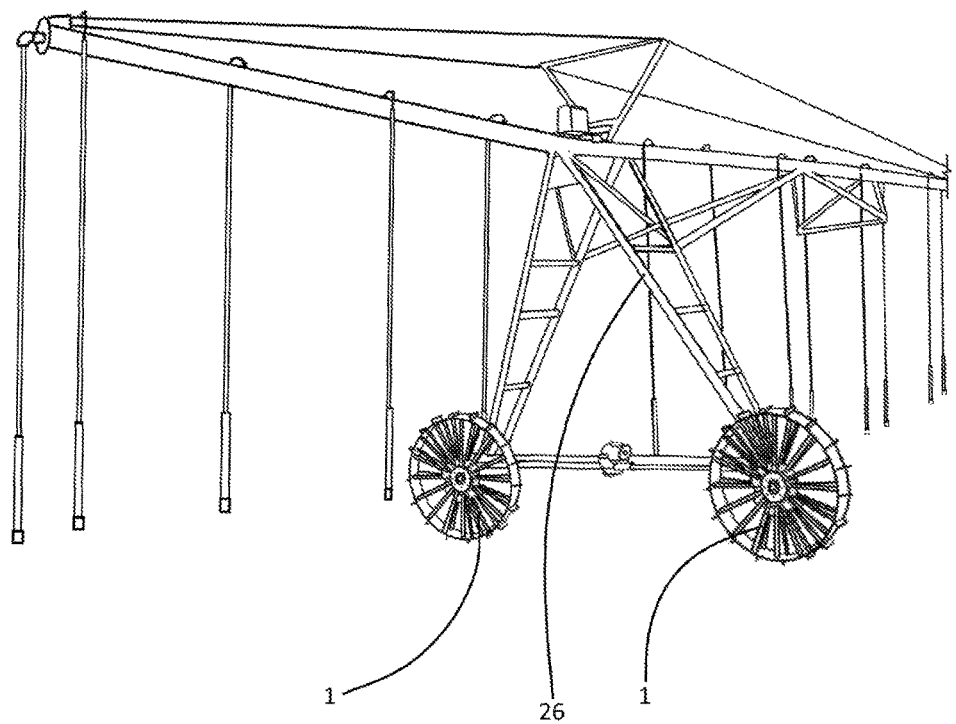

FIG. 4 redepicts the wheel of FIG. 1, the view showing a pair of such wheels utilized for rolling carriage of a center pivot irrigation system "A" frame tower.

DETAILED DESCRIPTION OF A PREFERRED EMBODIMENT

Referring now to Drawing FIG. 1, a preferred embodiment of the instant inventive center pivot irrigation system wheel is referred to generally by Reference Arrow 1. A central or axially positioned structure of the inventive wheel 1 comprises a wheel hub mounting disc 18, such disc preferably having a radial array of lug receiving apertures 20 and a central wheel hub access aperture 19. An annular spoke mounting flange 16 is preferably fixedly mounted to or formed wholly with disc 18 to form an oppositely laterally opening hub receiving concavity 15.

A plurality of spoke pairs 10,12 are provided, each spoke pair comprising a lateral spoke 10 and an oppositely lateral spoke 12. A proximal end of each such spoke is preferably fixedly attached by means of welding to the radially outer surface of flange 16, and such spoke pairs are preferably arranged to include or lie within axially extending planes of orientation which intersect at the rotation axis 3.

Figure 2:
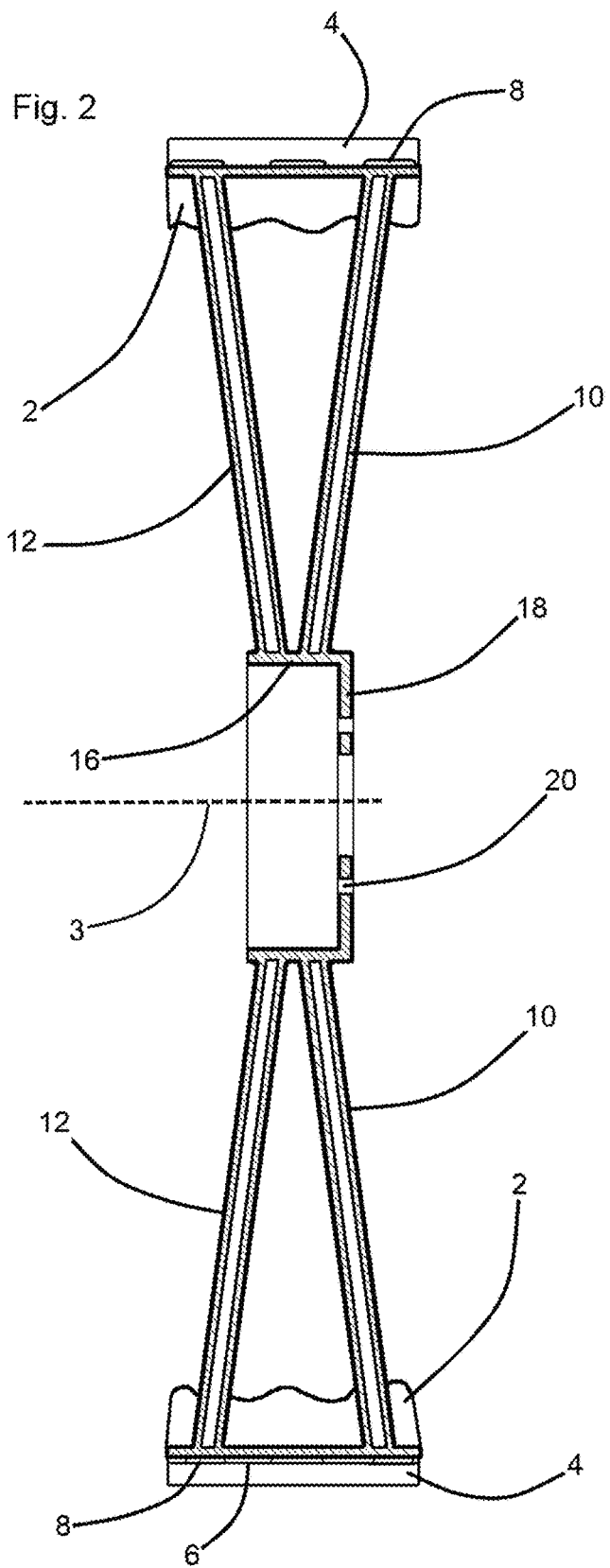
FIG. 2 is a sectional view as indicated in FIG. 1, the view having background structures removed.
Figure 3:
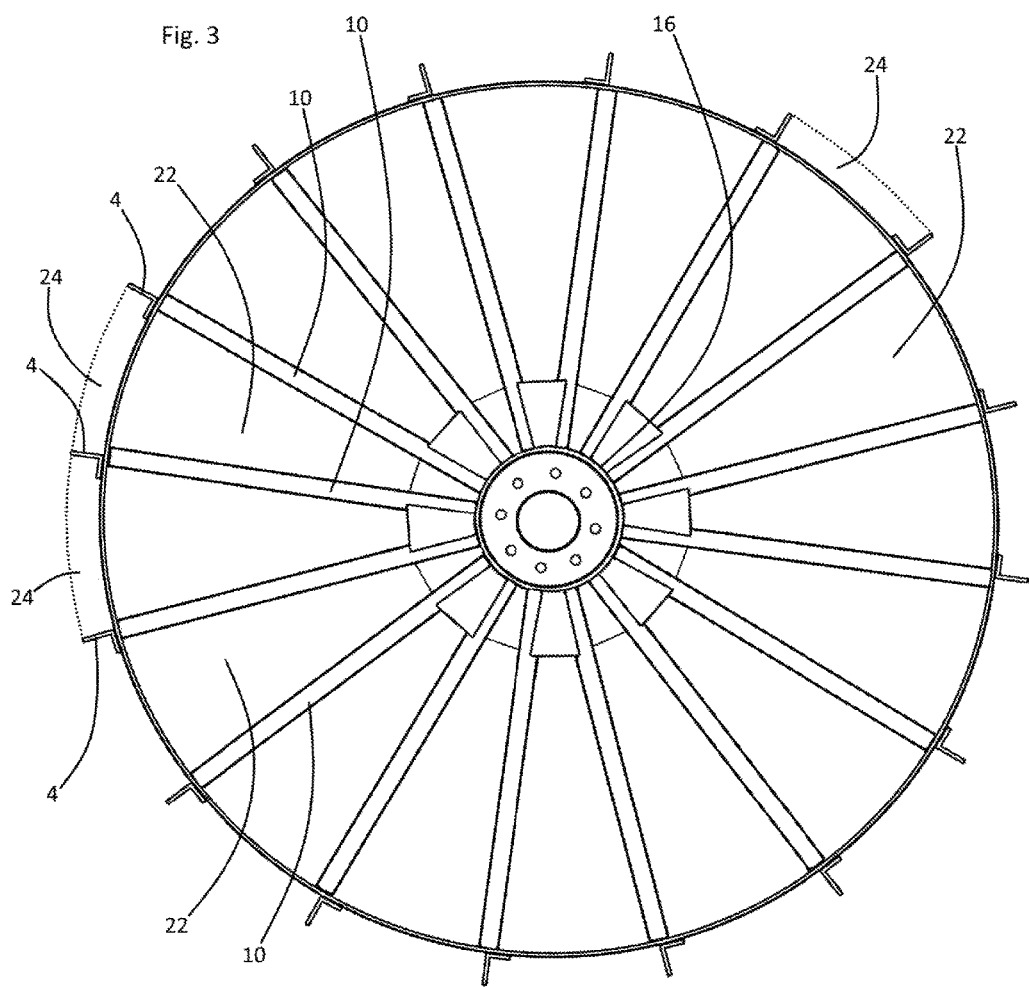
FIG. 3 is a side view of the wheel of FIG. 1.

In the example of FIGS. 1-3 which includes and incorporates 16-spoke pairs 10,12, the planar alignments of such spoke pairs causes each of the spoke pairs to lie within or to coincide with one of eight intersecting geometric planes, each such plane including the rotation axis 3. Such planar orientations of the spoke pairs 10,12 advantageously form and define a first plurality of axially extending through spaces 22 (sixteen in number according to the example of FIGS. 1-3), which assist in clearing mud from the wheel. Each of the through spaces 22 is bounded by a circumferentially adjacent pair of the spoke pairs 10,12. Gusset plates 14 spanning between proximal ends of the spokes 10,12 are preferably provided for enhancing circumferential rigidity of the spokes. Such gusset plates 14 are, as depicted, alternatingly placed about the hub so that every other through space 22 opens laterally or oppositely laterally. The alternating spacing of the gussets enhances structural rigidity while providing for lateral and oppositely lateral through space openings.

Referring in particular to FIG. 2, each of the spoke pairs 10,12 preferably has splayed distal ends wherein the lateral spoke 10 is deflective laterally, and the oppositely lateral spoke 12 is deflected oppositely laterally. Such splaying of spoke distal ends advantageously forms axially aligned "V"s which support and enhance the structural rigidity of a distally attached cylindrical rim member 2.

Further structural components of the instant inventive wheel 1 comprise a plurality of treads 4, each tread 4 preferably being fixedly attached to the outer peripheral surface of rim 2 by means of an "L" flange 6 and by means of welds 8. In the preferred embodiment, the treads 4 are substantially rectangular and are laterally oblongated to substantially co-extend with the lateral extension of the rim 2. Similarly with spoke pairs 10,12, each tread 4 is preferably aligned with and intersected by axial planes which intersect rotation axis 3, such alignments of the treads 4 advantageously forming a second series of axially extending through passages 24, each such passage opening laterally and oppositely laterally. Each second through passage 24 is preferably bounded by a circumferentially adjacent pair of the treads 4.

Referring to FIG. 4, in use of the instant inventive wheel 1, pairs of such wheels may be mounted upon the rotation hubs of the "A" frame support towers 26 of the depicted center pivot irrigation system. Upon such mounting, the wheels 1 provide a high level of "wheel floatation" ground contact. Such enhanced wheel contact surface area advantageously resists the commonly known tendency of center pivot irrigation wheels to sink into and become stuck within muddy farm ground. The enhanced ground contact surface area of the wheel 1 in combination with the provided axially extending and oriented treads 4 provides for secure center pivot rig driving traction during irrigation operation.

In the event that mud accumulates upon and within such wheels 1, the mud may be easily cleaned through utilization of an implement such as a hoe which may draw mud from the proximal ends of the through spaces 22, or an enlarged head mandrel (not depicted within views) which may be advantageously driven in the axial direction within and through the first and second axially aligned through passages 22 and 24. The axial plane alignments of the spoke pairs and the treads advantageously allows such wheel cleaning to proceed in an unobstructed fashion.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:
1. A center pivot irrigation system wheel comprising:
  (a) hub having an axis of rotation and having lateral and oppositely lateral sides;
  (b) a plurality of spoke pairs, each spoke among the plurality of spoke pairs having a radially outer distal end and having a proximal end, each proximal end being fixedly attached to the hub, each spoke pair comprising a lateral spoke and an oppositely lateral spoke, said each spoke pair's lateral spoke being intersected by an axially extending plane of orientation, and said each spoke pair's oppositely lateral spoke being intersected by said axially extending plane of orientation;
  (c) a first plurality of axially extending through spaces, each through space among the first plurality of axially extending through spaces being bounded by a circumferentially adjacent pair of the spoke pairs;
  (d) an annular rim having an outer surface, the distal end of each spoke among the plurality of spoke pairs being fixedly attached to the rim;
  (e) a plurality of substantially rectangular treads, wherein each tread is fixedly attached to the annular rim's outer surface, and wherein each tread is intersected by an axially extending plane of orientation; and
  (f) a second plurality of axially extending through spaces, each through space among the second plurality of axially extending through spaces being bounded by a circumferentially adjacent pair of the treads, wherein the radially outer distal ends of the lateral and oppositely lateral spokes of each spoke pair are axially splayed to form "V" configurations.

2. The center pivot irrigation system wheel of claim 1 wherein the substantially rectangular treads and the rim have lateral dimensions, the lateral dimensions of the substantially rectangular treads and the rim being substantially equal to each other.

3. The center pivot irrigation system wheel of claim 2 wherein each substantially rectangular tread comprises an "L" beam.

4. The center pivot irrigation system wheel of claim 1 wherein the hub comprises a mounting plate and annular flange combination.

5. The center pivot irrigation system wheel of claim 4 further comprising a plurality of gusset plates, each gusset plate spanning between the proximal ends of circumferentially adjacent pairs of the spokes.

6. The center pivot irrigation system wheel of claim 5 wherein the gusset plates comprise lateral and oppositely lateral gusset plate pluralities.

7. The center pivot irrigation system wheel of claim 6 wherein one of the first axially extending through spaces opens oppositely laterally from each of the lateral gusset plates, and wherein one of the first axially extending through spaces opens laterally from each of the oppositely lateral gusset plates.

\* \* \* \* \*